United States Patent
Lam et al.

(10) Patent No.: US 8,266,576 B2
(45) Date of Patent: Sep. 11, 2012

(54) SHARING LIVE APPLIANCES

(75) Inventors: Monica Sin-Ling Lam, Menlo Park, CA (US); Andrew D. Berkheimer, Boston, MA (US); Constantine P. Sapuntzakis, Mountain View, CA (US); John C. Whaley, San Mateo, CA (US); Ramesh U. V. Chandra, Belmont, CA (US); Michael K. Chen, Palo Alto, CA (US); Won-Suk Chun, Belmont, CA (US); Kelvin Kam-Suen Yue, Sunnyvale, CA (US)

(73) Assignee: moka5, Inc., Redwood City, CA (US)

( * ) Notice: Subject to any disclaimer, the term of this patent is extended or adjusted under 35 U.S.C. 154(b) by 1440 days.

(21) Appl. No.: 11/833,208

(22) Filed: Aug. 2, 2007

(65) Prior Publication Data

US 2008/0034364 A1     Feb. 7, 2008

Related U.S. Application Data

(60) Provisional application No. 60/835,258, filed on Aug. 2, 2006.

(51) Int. Cl.
*G06F 9/44* (2006.01)

(52) U.S. Cl. ........ 717/100; 717/128; 717/131; 717/132; 717/170; 717/177; 709/201; 709/210

(58) Field of Classification Search .................. 717/128, 717/131, 132, 100, 168–170; 711/170, 6, 711/135, 202, 133, 159; 709/201, 210
See application file for complete search history.

(56) References Cited

U.S. PATENT DOCUMENTS 6,604,182 B1 * 8/2003 Sexton et al. ................. 711/170
6,826,750 B1 * 11/2004 Curtis et al. .................. 717/170
(Continued)

FOREIGN PATENT DOCUMENTS

JP     2006072591 A     3/2006
(Continued)

OTHER PUBLICATIONS

Saddik et al.; JASMINE: Java application sharing in multiuser interactive environments; aquired from http://citeseerx.ist.psu.edu/viewdoc/download?doi=10.1.1.4.7648&rep=rep1&type=pdf; 2000, pp. 1-13.*

(Continued)

*Primary Examiner* — Wei Zhen
*Assistant Examiner* — Satish Rampuria
(74) *Attorney, Agent, or Firm* — Park, Vaughan, Fleming & Dowler LLP

(57) ABSTRACT

Methods, systems, and apparatus, including computer program apparatus, implementing techniques for publishing, subscribing to, or playing live appliances. A live appliance includes a current virtual machine image. In publishing, a proxy file of a live appliance file type is provided to the publisher. The type is mapped to a live appliance player; so that when a proxy file is opened, the current virtual machine image is run. The player automatically binds a writeable file system external to the virtual machine image to the image to provide file storage that is accessible from within the virtual machine image and from a host operating system. The player also creates a subscription to the live appliance on the host computer if one does not exist when the proxy file is run. With the subscription, the player runs the then-current virtual machine image whenever the live appliance is run.

54 Claims, 9 Drawing Sheets

U.S. PATENT DOCUMENTS

| | | |
|---|---|---|
| 7,272,831 B2 * | 9/2007 | Cota-Robles et al. ............ 718/1 |
| 2002/0143842 A1 | 10/2002 | Cota-Robles et al. |
| 2004/0083471 A1 * | 4/2004 | Nam et al. ................... 717/168 |
| 2006/0101189 A1 | 5/2006 | Chandrasekaran et al. |
| 2006/0277542 A1 | 12/2006 | Wipfel |
| 2007/0006205 A1 | 1/2007 | Kennedy et al. |
| 2007/0055972 A1 * | 3/2007 | Brown et al. ................. 717/174 |
| 2007/0089111 A1 | 4/2007 | Robinson et al. |
| 2007/0162521 A1 | 7/2007 | Raghunath |
| 2007/0198713 A1 | 8/2007 | Tsao et al. |
| 2008/0104588 A1 | 5/2008 | Barber et al. |

FOREIGN PATENT DOCUMENTS

| | | |
|---|---|---|
| WO | 2006/036277 A2 | 4/2006 |
| WO | 2007/149671 A2 | 12/2007 |

OTHER PUBLICATIONS

Huang et al.; What is appliance computing?; http://citeseerx.ist.psu.edu/viewdoc/download?doi=10.1.1.9.5661&rep=rep1&type=pdf; 2001, pp. 1-5.*

* cited by examiner

SHARING LIVE APPLIANCES

CROSS-REFERENCE TO RELATED APPLICATIONS

This application claims the benefit under 35 U.S.C. §119(e) of U.S. Patent Application No. 60/835,258, titled "Sharing Live Appliances," filed Aug. 2, 2006, which is incorporated herein by reference.

BACKGROUND

This specification relates to creating, publishing, subscribing to, and using virtual machines.

A virtual machine is software construct that appears to be hardware on which a guest operating system and applications can be installed. In an emulator implementation, the virtual machine is an emulator, simulating all of the hardware used by the guest operating system and applications. In para-virtualization, the virtual machine allows the guest operating system and applications to run on the host hardware, but requires that the guest operating system be modified to use a special API (application programming interface) to run on the virtual machine monitor. In machine-level or full virtualization, the virtual machine allows a guest operating system that is implemented for the underlying host processor to be run without modification.

In a para-virtualization or a machine-level virtualization implementation, a virtual machine monitor is used to bind the virtual machine to the underlying host hardware. In some architectures, the virtual machine monitor runs directly on the host hardware, in a hypervisor configuration. In others, it runs as an application on the host operating system.

In some architectures, a lightweight hypervisor is run between the host operating system and the host hardware that provides a calling interface for both the host operating system and the virtual machine monitors.

In some architectures, a hypervisor uses the services of a host operating system for device and other support.

SUMMARY

This specification describes technologies for publishing, distributing, and subscribing to one or more live appliances. A live appliance includes a virtual machine image, and generally a sequence of virtual machine images.

In general, one aspect of the subject matter described in this specification can be embodied in methods that include the actions of receiving in a computer a request to run a live appliance, the live appliance providing a computing environment that a user can run on the computer, the live appliance being defined by a data source that includes a version description for a current version of a virtual machine image; determining whether the computer has subscribed to the live appliance, and if not, subscribing to the live appliance on the computer, reading the data source for the live appliance, and using the current version description to initiate-downloading of the current version of the virtual machine image to the computer; when the computer has subscribed to the live appliance, detecting whether a change has occurred in the data source that changes the version description designated as the current version description, and if a change has occurred, reading updated data from the data source, the updated data designating a second version description as the current version description, the second version description describing a different second version of the virtual machine image as the current version of the virtual machine image; obtaining the current version of the virtual machine image as described by the second version description; and running the current version of the virtual machine image. Other embodiments of this aspect include corresponding systems, apparatus, and computer program products.

In general, another aspect of the subject matter described in this specification can be embodied in methods that include the actions of uploading a virtual machine image to a distribution service; and posting a live appliance to a subscription service by providing data source information to the subscription service, the data source information including version information describing a version of a virtual machine image, the version having a virtual machine version configuration. Other embodiments of this aspect include corresponding systems, apparatus, and computer program products.

In general, another aspect of the subject matter described in this specification can be embodied in systems that include one or more computers coupled in data communication with each other and to a data communication network to interact with users; and a post interface, an upload interface, and a system database implemented on the one or more computers; the post interface being operable to receive post input over the network from a publisher user posting a live appliance to the system, the post input including data source information, the data source information including version information describing a version of a virtual machine image, the version having a virtual machine version configuration, in response to which the system registers the live appliance, creates a corresponding data source including the data source information, and stores the corresponding data source in the system database; the upload interface being operable to receive upload input over the network from the publisher user, the upload input including the version of the virtual machine image, and to store the virtual machine image in the system database; where the system being operable to provide a proxy for the live appliance to the publisher user in response to the publisher posting the live appliance. Other embodiments of this aspect include corresponding methods, apparatus, and computer program products.

In general, another aspect of the subject matter described in this specification can be embodied in methods that include the actions of opening a proxy file in response to a user action on a computer, automatically invoking a player application on the computer, the player application performing player actions that include using the proxy file to locate the current version of the virtual machine image; and causing the current version of the virtual machine image to be run by a virtual machine monitor. Other embodiments of this aspect include corresponding systems, apparatus, and computer program products.

In general, another aspect of the subject matter described in this specification can be embodied in memory devices for storing data for access by an application program being executed on a data processing system, whether the memory devices include a data structure stored in the memory, the data structure including a proxy for a live appliance; a data source; and one or more virtual machine version configurations, each version configuration including one or more links to a corresponding virtual machine image; wherein the proxy includes a source identifier that can be resolved to a location of the data source; the data source includes data designating one of the versions of the virtual machine image as the current version, the current version being described by a current version description; and each version configuration contains configuration data describing the corresponding virtual machine image.

In general, another aspect of the subject matter described in this specification can be embodied in methods that include the actions of receiving in a user interface of a computer an uninterrupted user action opening a proxy document and, in response to the user action and without further user intervention, performing actions that include identifying, based on information in the proxy document, a live appliance; determining whether the computer has subscribed to the live appliance and, if not, subscribing to the live appliance; and running a current version of a virtual machine image from the live appliance, the live appliance including one or more versions of the virtual machine image. Other embodiments of this aspect include corresponding systems, apparatus, and computer program products.

In general, another aspect of the subject matter described in this specification can be embodied in methods that include the actions of registering a live appliance file type on a computer to associate the file type with a player application on the computer, wherein running the player application in response to a user action or a programmatic action opening a first document of the file type on the computer, the player application performing actions that include acting on the first document by reading feed data from a first live appliance data feed source, the data feed source being the first document or being identified by a source locator in the first document; reading a first virtual machine image, the virtual machine image being in the feed source or being identified by an image locator in the feed source; and causing the first virtual machine to be run by a virtual machine monitor. Other embodiments of this aspect include corresponding systems, apparatus, and computer program products.

In general, another aspect of the subject matter described in this specification can be embodied in methods that include the actions of receiving in a user interface of a computer an uninterrupted user action opening a proxy document having a live appliance file type and, in response to the user action and without further user intervention, automatically invoking a player application on the computer, the player application performing actions that include identifying a remote source identifying a current version of a virtual machine image based on information in the proxy document; determining whether a copy of the current version of the virtual machine image has been downloaded to the computer and if not, beginning to download the virtual machine image to the computer; and running the virtual machine image on a virtual machine monitor on the computer. Other embodiments of this aspect include corresponding systems, apparatus, and computer program products.

In general, another aspect of the subject matter described in this specification can be embodied in methods that include the actions of binding data files for a virtual machine image to the virtual machine image automatically from outside the virtual machine image, the data files being also visible as local files on the computer, the data files being bound by being mounted as a directory hierarchy within or as a home directory or a user profile in the virtual machine image. Other embodiments of this aspect include corresponding systems, apparatus, and computer program products.

In general, another aspect of the subject matter described in this specification can be embodied in computer program products tangibly embodied in a computer-readable medium that include a dependent helper in a virtual machine image to implement a user file system protocol to read and write the data files on a local data store, the dependent helper being operable to perform actions including binding data files for the virtual machine image to the virtual machine image automatically from outside the virtual machine image, the data files being also visible as local files on the computer, the data files being bound by being mounted as a directory hierarchy within or as a home directory or a user profile in the virtual machine image; and a player operable to perform actions including configuring a host computer to provide a guest operating system with the user file system for reading and writing the data files. Other embodiments of this aspect include corresponding systems, apparatus, and methods.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

This specification describes technologies for publishing, distributing, and subscribing to one or more live appliances. A live appliance includes a sequence of virtual machine images.

Figure 1A:
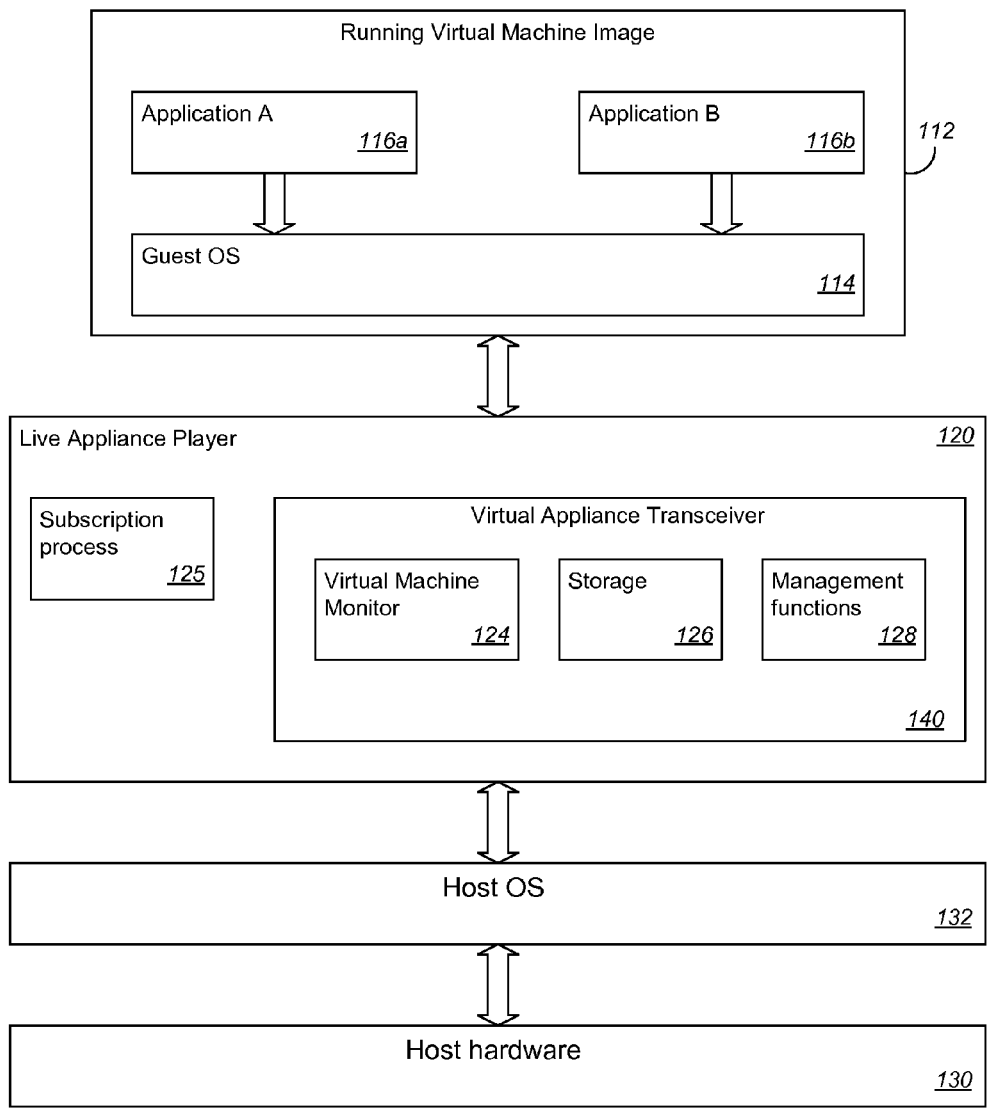
FIGS. 1A, 1B, and 1C are schematic diagrams illustrating alternative architectures using one or live appliances in accordance with the invention.
Figure 1B:
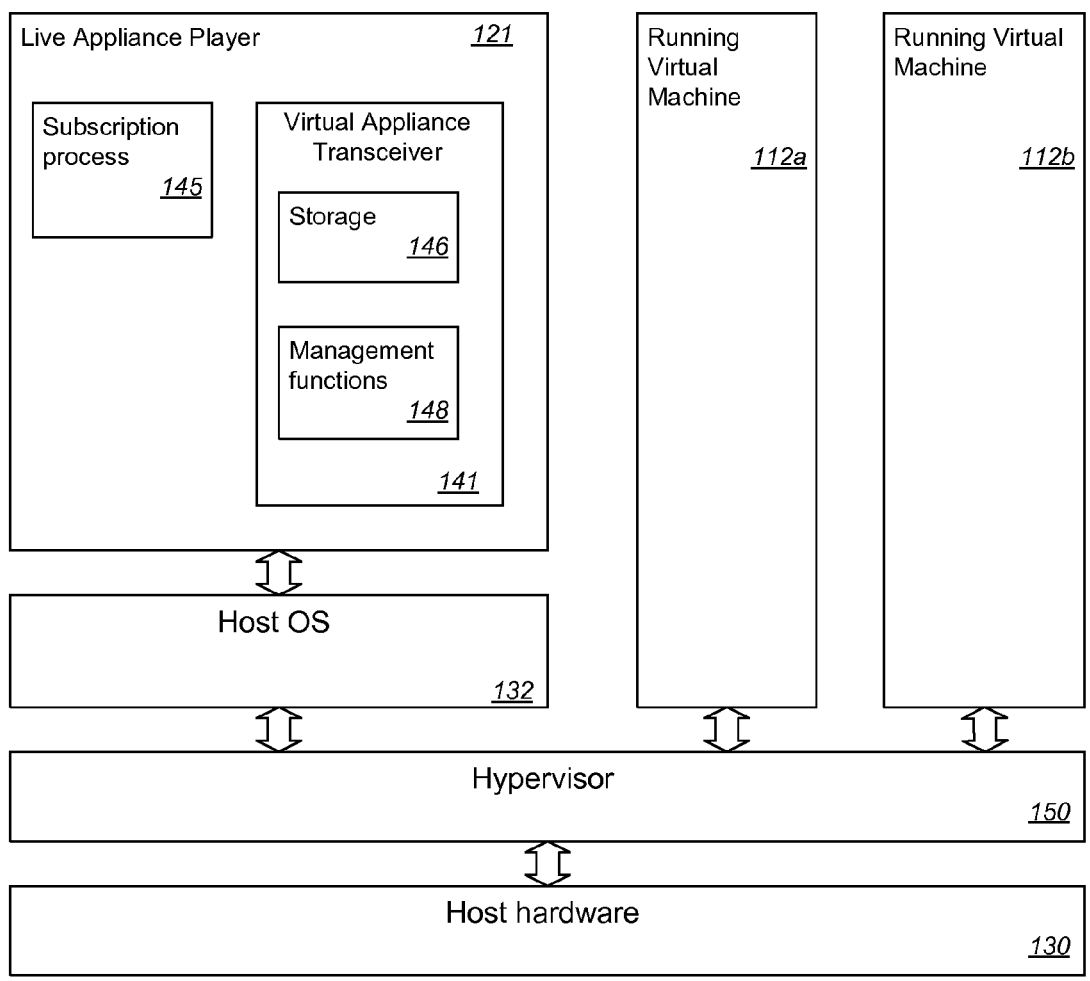
Figure 1C:
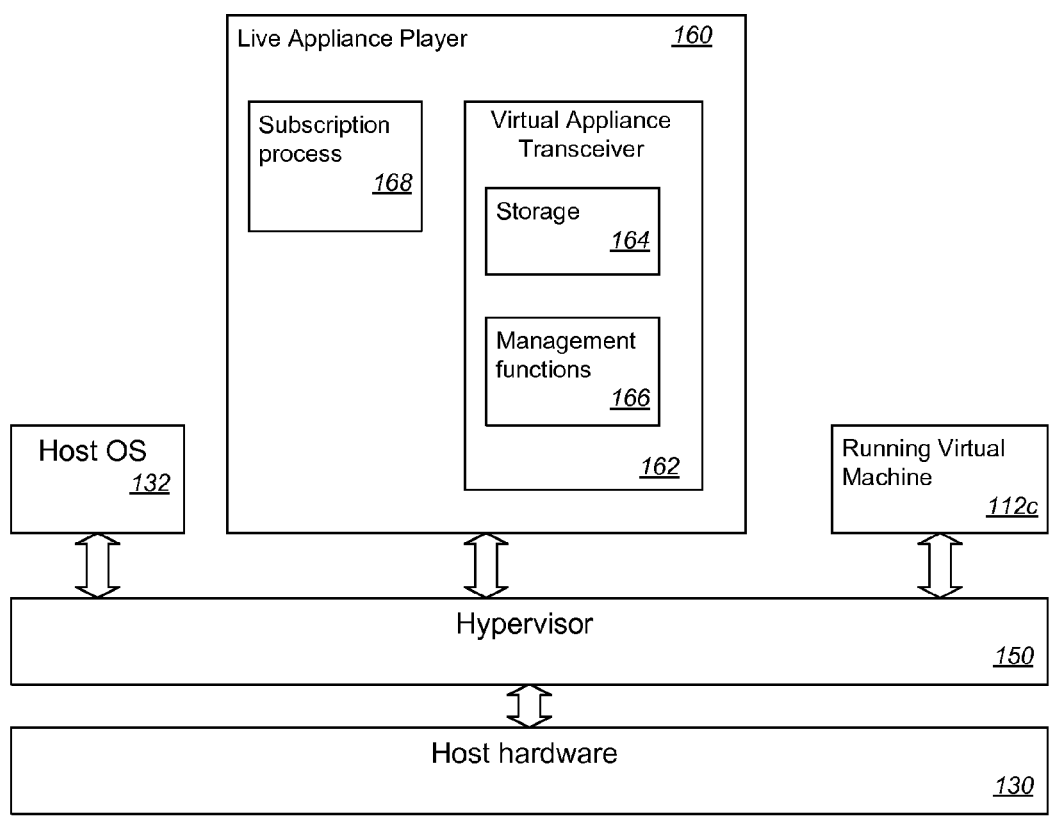

FIGS. 1A, 1B, and 1C show illustrative host system architectures for using a virtual machine from a live appliance.

In the architecture shown in FIG. 1A, a host computer includes host hardware 130 and a host operating system 132. The host computer provides a host file system, generally as part of the host operating system 132, which can be stored on a variety of storage mediums, e.g., hard disks and flash disks, local to or remote from the host computer. The host computer generally also includes one or more host devices, e.g., keyboard, mouse, or Ethernet card.

The host computer will also be referred to as the subscriber or subscriber computer, because live appliance player software 120 running on the computer causes it to subscribe to a live appliance. The live appliance is located on a remote service (e.g., a subscription service). The subscription service is described in more detail in reference to FIG. 2. The live appliance is described in more detail in reference to FIG. 3.

A live appliance includes or defines a sequence of one or more virtual machine images, one of which is identified as the current virtual machine image by live appliance metadata. A virtual machine image is a specific instance of a virtual machine. There are many varieties of virtual machines, for example, full or machine-level virtualization and para-virtualization virtual machines. A full virtualization virtual machine can run more than one kind of an unmodified guest operating system. Para-virtualization virtual machines can only run guest operating systems that have been modified to run on a special architecture that is specified by the virtual machine implementation.

A virtual machine image generally encapsulates a complete computer configuration. A virtual machine image can include the contents of local storage (e.g., hard disks), RAM, and device configurations. The contents of the local storage can include a variety of software systems, generally including a guest operating system and one or more applications, which can be applications of any kind, including word processors, financial applications, web browsers, or other software applications. When a virtual machine image is run by a virtual machine monitor, it allows the user of the virtual machine image to run the applications on the guest operating system.

FIG. 1A illustrates a running virtual machine image 112 that has two applications, Application A 116a and Application B 116b, installed to run on the guest operating system 114. The applications 116a, 116b and the guest operating system 114 were installed on the virtual machine of the virtual machine image before the virtual machine image 112 was downloaded by the live appliance player 120. Additional applications can be installed after the virtual machine 112 has been downloaded.

The virtual machine image 112 is being run by a virtual machine monitor 124 that is part of, or alternatively invoked by, a live appliance player 120. In the implementation illustrated, the virtual machine monitor 124 is part of a virtual appliance transceiver (VAT) 140, which also includes management software 128 to perform management functions, e.g., receiving virtual machine data blocks, exporting data for backup, and publishing virtual machine images. The virtual appliance transceiver 140 also includes storage 126, memory and data storage, which can be implemented in the form a file or a directory of files on a native host file system, for use in caching blocks of the virtual machine image and other purposes. In some implementations, the VAT or live appliance player does not include, but instead invokes, an appropriate virtual machine monitor 124.

A description of a suitable virtual appliance transceiver can be found in U.S. patent application Ser. No. 11/007,911, entitled "Cache-Based System Management Architecture With Virtual Appliances, Network Repositories, And Virtual Appliance Transceivers", filed Dec. 8, 2004, and U.S. Patent Application No. 60/528,220, filed Dec. 8, 2003. The entire content of both applications is incorporated in this application by reference. A description of a suitable virtual appliance transceiver can also be found in R. Chandra, N. Zeldovich, C. Sapuntzakis, and M. S. Lam, "The Collective: A Cache-Based System Management Architecture," Proceedings of the 2nd Symposium on Networked Systems Design and Implementation (NSDI 2005), May 2005.

The virtual appliance transceiver transmits and receives virtual machine images in a distributed environment such as the Internet or a private network. The live appliance player 120 can cause the most current virtual machine image, as received by the VAT to be executed by a virtual machine monitor 124. Example virtual machine monitors include VMware Player®, available from VMware, Inc. of Palo Alto, Calif., and Microsoft® Virtual Server, available from Microsoft Corporation of Redmond, Wash.

The live appliance player 120 performs a subscription process 125. The subscription process 125 ensures that live appliance player 120 has the current virtual machine image for the live appliance. The subscription process 125 can run as a background process and receive periodic updates on the status of, and changes to, the virtual machine images of a live appliance to which the player has subscribed. The subscription process 125 can poll a service to determine if new updates are available, or it can receive updates pushed by a service. New updates are downloaded by the process 125 as necessary. If updates are available the live appliance player can install the updates without user intervention, though the update may not be available until the user restarts the virtual machine.

FIG. 1B illustrates an alternative arrangement of the elements of the architecture. In this arrangement, a hypervisor 150 is running on the hardware 130, and the host operating system 132 is running on the hypervisor. An arrangement of this kind is implemented in a Xen™ hypervisor, available from XenSource, Inc. of Palo Alto, Calif. Normal virtual machine images 112a and 112b run on the hypervisor 150. Some guest operating systems in the guest virtual machines are modified to run on the hypervisor.

Because the virtual machine monitor is substantially implemented in the hypervisor 150, the live appliance player 121 running on the host operating system 132 does not include the virtual machine monitor, but still includes the other functionality of the live appliance player 120 described in reference to FIG. 1A, namely a subscription process 145 corresponding to subscription process 125, a virtual appliance transceiver 141, which corresponds to virtual appliance transceiver 140 minus the virtual machine monitor 124, but including storage 146 and management functions 148 corresponding to storage 126 and management functions 128, respectively.

FIG. 1C illustrates a further alternative arrangement of the elements of the architecture. In this arrangement, the live appliance player 160 is constructed to run directly in a virtual machine on a guest operating system on the hypervisor 150, as are the subscription process 168, the virtual appliance transceiver 162, the storage 164 and the management functions 166, which correspond to the modules previously described of the same name. As in the arrangement of FIG. 1B, any number of guest virtual machine images 112c can be run on the hypervisor 150.

To provide writeable user file storage for applications running on a virtual machine, the live appliance player can provide a networked file system to be mounted in the virtual machine. The mounting can be done manually by a user of the virtual machine or, more conveniently, it can be done automatically by a helper program installed on the virtual machine by the publisher. This writeable storage may be referred to as a user file system, to distinguish it from the file system embodied in the virtual machine image disks. The user file system can be also be visible to and mounted by programs running on the host operating system 132 of the host computer. The storage for the user file system can be provided by any memory device attached to, or in communication with, the host computer, including an internal disk drive, an external disk drive, a file server, an attachable disk drive, or an attachable solid state memory device (e.g., USB flash drive or an audio or video player).

A live appliance player can create a user file system by configuring a directory in the host file system that will store the user files for a virtual machine image. The live appliance player then configures the host operating system to export the directory using a network file system. For example, in the Microsoft® Windows operating system, the user file system is conveniently a Common Internet File System (CIFS). For the Linux operating system, the user file system can conveniently be either a CIFS or NFS file system. Network path(s) describing how to mount the user files (e.g., \\192.168.74.1\NTWSHR$ for CIFS) are passed to the running virtual machine image, to help the virtual machine find and mount the exported directory. When a virtual machine image is started, the virtual machine reads the network paths and sets up the user home directory (e.g., in the Linux operating system) or profile (e.g., in the Windows operating system), or a directory under the home directory or part of the profile (e.g. My Documents), to point to the user file system.

In some implementations, it is possible to run a custom (e.g., non-NFS and non-CIFS) user file system (e.g., VMware® Workstation Shared Folders or Microsoft™ Virtual PC Shared Folders) over a non-network interface between a guest operating system and the host operating system with the goal of improving performance and reliability. Such implementations integrate the file system server into the virtual machine monitor to improve performance. The implementation includes user file system clients for Windows or Linux guests or both. The implementation has interfaces by which the guest operating system can call into the host operating system requesting service and by which the host operating system can return status and data to the guest operating system. The custom user file system, as described, removes the overhead of the generality of the network protocols used with a networked file system.

Figure 2:
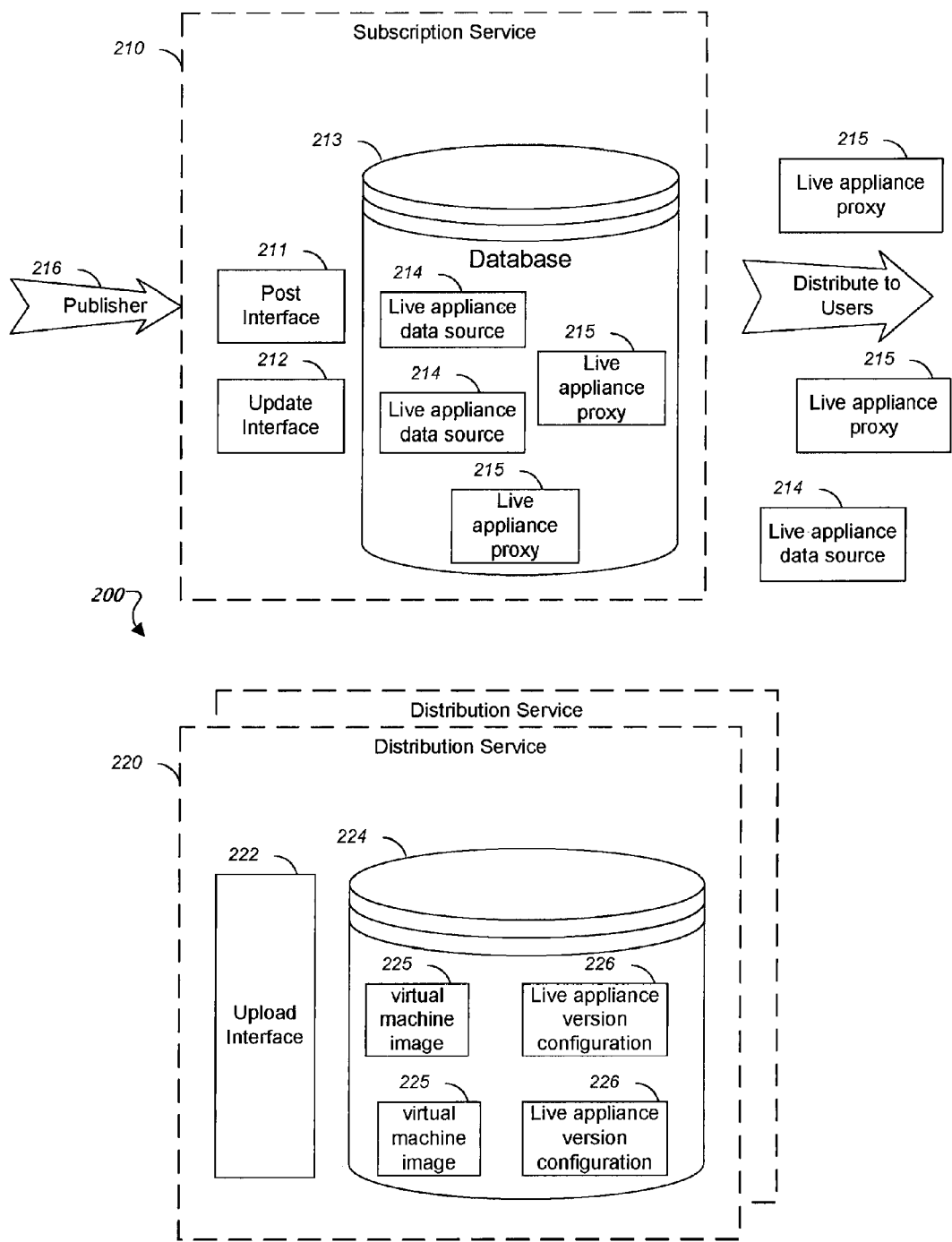
FIG. 2 is a schematic diagram illustrating an architecture for publishing, distributing, and subscribing to one or more live appliances.

FIG. 2 shows an illustrative architecture 200 of a system for publishing, distributing, and subscribing to one or more live appliances. The architecture 200 is used to facilitate the sharing of one or more live appliances over a network by publishers 216 of live appliances. The architecture 200 includes a subscription service 210 and a distribution service 220. The subscription service 210 and the distribution service 220 can exist on the same network server or on different network servers. The subscription service 210 and the distribution service 220 can also exist under the same administrative domain or they can exist under different administrative domains. Each service communicates with a database to obtain data to fulfill requests generated by users. A database can be any organized collection of data, whether or not managed by some kind of database management system, and whether or not stored in a single location. Requests are fulfilled using a live appliance player that can subscribe to or invoke a live appliance.

The subscription service 210 includes a post interface 211, an update interface 212, and a database 213. The interfaces are used in conjunction with the database to provide users with a mechanism to create and update live appliances through the generation or modification of data sources 214 and the generation of proxy files 215.

The post interface 211 accepts connections from a publisher 216. The publisher 216, using the post interface 211, can post a live appliance, which registers the live appliance and creates a corresponding data source 214 so that the live appliance can be accessed by other users. Publishing live appliances is described in more detail in reference to FIG. 5.

The update interface 212 also accepts connections from a publisher 216. The update interface allows the publisher 216 to update data sources files that already exist in the database 213. The update interface also ensures that the publisher 216 originally posted the data source that is being updated or is otherwise authorized to do so. Using the update interface is described in more detail in reference to FIG. 4.

A data source 214 contains data that describes a corresponding live appliance. When a live appliance is posted or updated, the corresponding data source is created or updated, respectively. A data source contains a unique identifier for the live appliance and version information for the one or more virtual machine images that the live appliance includes. A data source 214 for a live appliance can be distributed to users once the live appliance has been registered through the post interface. The live appliance player can poll a data source to determine if the data source has changed. Data sources are described in more detail in reference to FIG. 3.

A proxy file 215 is a metadata file used to point to a corresponding data source 214. Proxy files 215 can be distributed once a live appliance has been registered through the post interface 211. Proxy files 215 can be opened by a user through a graphical user interface (GUI) of a shell. Proxy files are described in more detail in reference to FIG. 3.

The distribution service 220 is used to distribute live appliances. The distribution service can be centralized (e.g., a hosted HTTP server) or distributed (e.g., a peer-to-peer file sharing network). The distribution service 220 includes an upload interface 222 and a database 224.

The upload interface 222 allows a user to upload a virtual machine image 225 that is later accessed by a live appliance. The upload interface 222 can communicate through a web based interface or a graphical user interface attached to an application, e.g., an FTP application.

Virtual machine images 225 are accessed by other users after the live appliance has been published through the post interface 211. Uploading the virtual machine images can be accomplished during the publishing processes, or can be accomplished at a later time. Publishing is described in more detail in reference to FIG. 5.

The distribution service serves or distributes, from the database 224, upon request, the virtual machine images 225 and the version configuration files 226 (e.g., virtual machine configuration files). The distribution service data database 224 can include one or more virtual machine images 225 and one or more version configuration files 226.

Version configuration files 226 provide configuration information for corresponding virtual machine images. Version configuration files 226 can exist in a variety of formats, e.g., a flat or an Extensible Markup Language (XML) file. In one embodiment, an XML formatted file is used. Version configuration files 226 are described in more detail in reference to FIG. 3.

Figure 3:
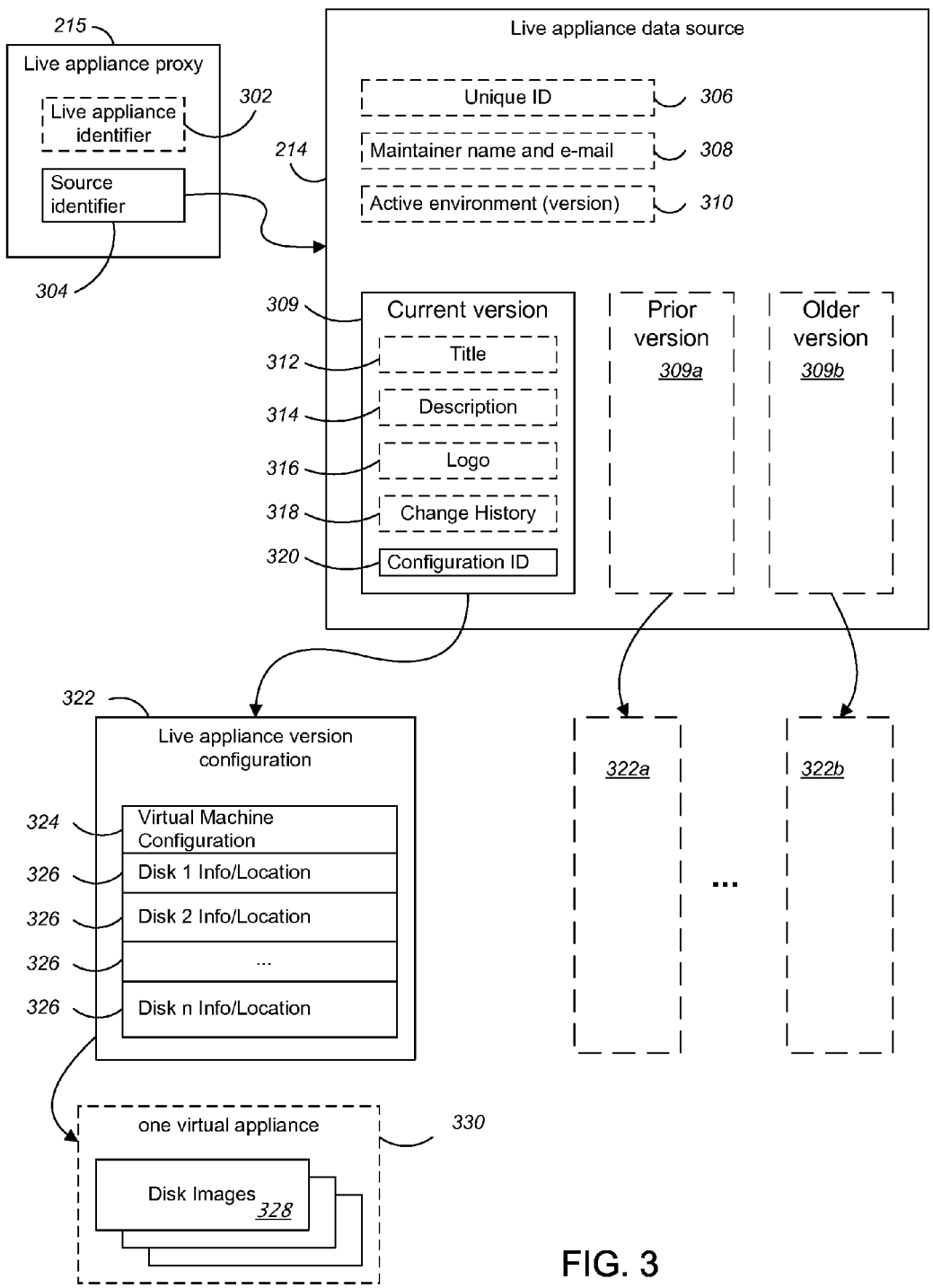
FIG. 3 is a schematic diagram illustrating an alternate view of an architecture for publishing, distributing, and subscribing to one or move live appliances.

FIG. 3 is a schematic diagram illustrating another view of the architecture for publishing, distributing, and subscribing to one or more live appliances. As described previously, a publisher receives a proxy file 215 after registering the live appliance with a subscription service. The publisher can distribute the proxy file 215 to subscribers. Subscribers open the proxy file 215, and, because the proxy file has a file type mapped to a live appliance player or a helper program, opening the proxy file results in starting the player or the helper. The file type can be mapped to the player or helper program by having been registered with an operating system on the subscriber's computer or with an application, e.g., a web browser, running on the subscriber's computer. This registration can be built into the operating system or application, or the subscriber can register the file type. If the file type is mapped to the helper, the helper informs the live appliance player of the user's opening of the proxy file. The proxy file includes an optional live appliance identifier 302 and a data source identifier 304. The data source identifier 304 can be used to access the data source 214. The identifier 304 can be, for example, a URI (Uniform Resource Identifier) pointing to an Rich Site Summary (RSS) feed that includes live appliance metadata and points to configuration data for a current version of the virtual machine image of the live appliance.

A data source 214 includes a unique identifier 306, and can include optional maintainer information 308, and information identifying an active environment 310, which can be a URI pointing to a configuration file for a current virtual machine image. The unique identifier 306 is represented as a string. The data source 214 is stored in the subscription server. The data source 214 can be implemented as an RSS feed or as a document pointed to by such a feed. The data source 214 for a live appliance to which a player has subscribed is regularly polled by the player, which downloads updates as the data source 214 changes. In alternative implementations, the player learns of updates from update notifications pushed to live appliance subscribers.

The maintainer information 308 specifies the name and e-mail address of the one or more individuals responsible for the live appliance. Maintenance responsibilities include but are not limited to updating new live appliances on the subscription servers, including uploading new virtual machine images for a live appliance to the distributions servers.

A version description 309 can be implemented as a separate file or it can be included as part of the data source 214. The active environment 310 information can be a URI pointing to a version description file 309. The active environment can optionally be implicit, if only one version description exists.

A version description can include a number of optional items of information: a title 312, a description 314, a logo 316, and a change history 318. The version description includes configuration identifier 320. If the data source 214 includes additional version descriptions 309*a*, 309*b* or immediately prior versions of the virtual machine image, portions of those version descriptions can be the same, e.g., the title 312, while others will generally be different e.g., the change history 318.

The title 312 is a short string that defines a name for the live appliance. For example, "Hikarunix" or "Elive 0.4.2." The description 314 is a string of generally greater length than the title 312 and is used to specify the characteristics of the live appliance. Example characteristics include the operating system or applications that the live appliance has installed. The logo 316 is used to graphically represent the live appliance as an icon. Logos can be specified as a URI to an image file.

The configuration identifier 320 is a network reference, e.g., a URI, that can be used to identify a configuration file 322, e.g., a virtual machine configuration file, that specifies configuration information for a corresponding virtual machine image. Configuration files 322 322*a*, 322*b* are stored in distribution servers.

The current configuration file 322 includes virtual machine configuration information 324 and disk properties and location information 326. The configuration file 322 can exist in a variety of formats, e.g., flat-file or XML.

Virtual machine configuration information 324 is a reference to a virtual machine description file, for example, a VMware.vvmx file. A VMware.vmx file can specify, for example, the memory settings of the virtual machine image, the type of disk controller, the number of network interfaces, and the address of each network interface, among other things.

The disk properties and location information 326 specifies, for example, the size of the disk and whether the contents of the disk persist across restarts of the virtual machine image. The number of disks is specified when the virtual machine image is created and can vary. For example, the number of disks in a first version of a virtual machine image can differ from the number of disks in a second version of a virtual machine image.

Each disk specified by the disk properties and location information 326 can be stored in and accessed through one or more distribution services 220 as a disk image 328 of a virtual machine image 330. In one implementation, the disk images are copy-on-write (COW) disks.

Figure 4:
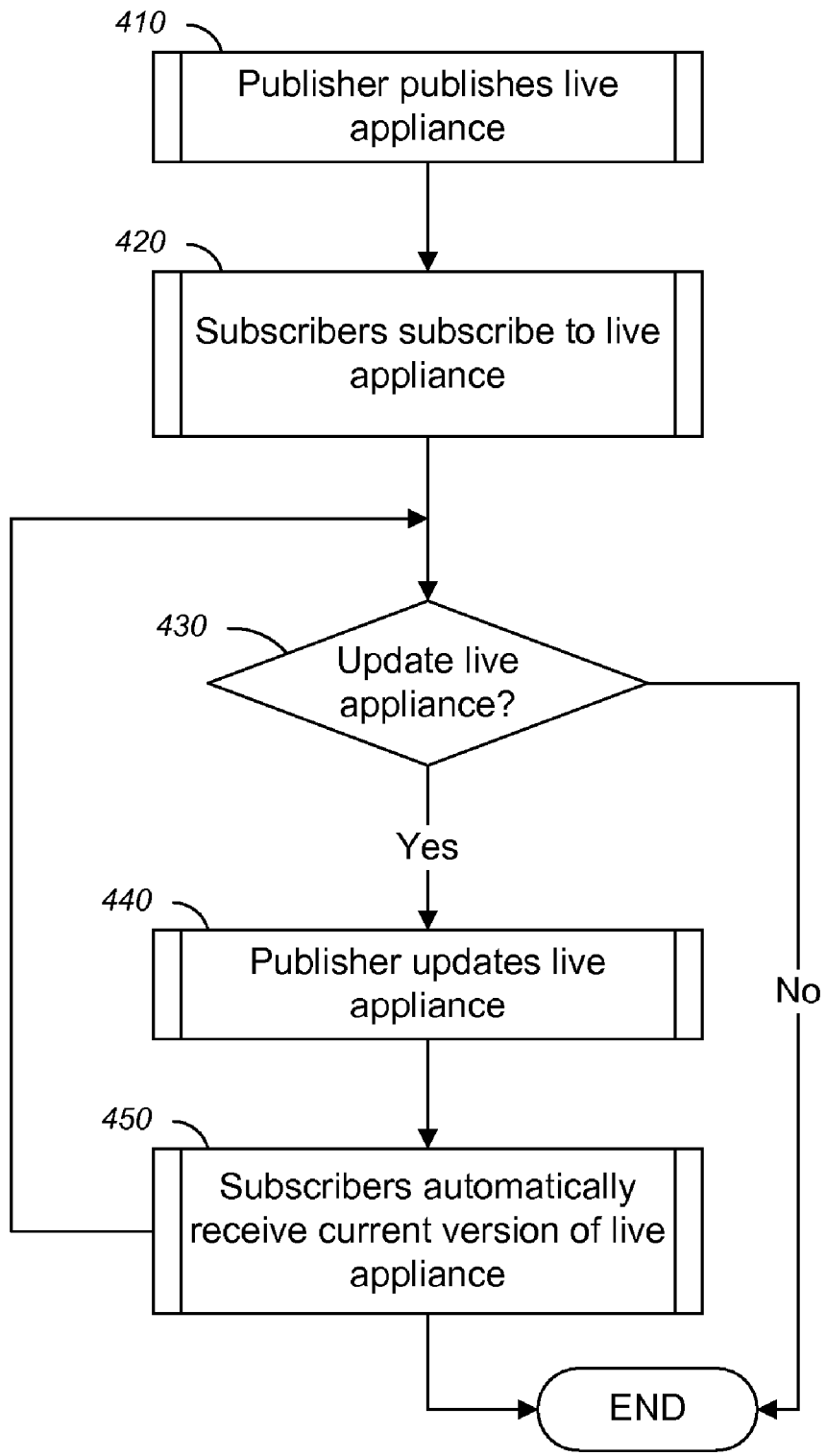
FIG. 4 is a flow chart illustrating a method for applying updates to a live appliance

FIG. 4 is a flow chart illustrating a method for applying updates to a live appliance.

As previously described, a publisher can publish (step 410) a live appliance through the use of the post interface. As part of the posting process, the publisher receives a proxy, e.g., an XML proxy file or a URL that includes the necessary metadata. Publishing is described in more detail in reference to FIG. 5.

The publisher can distribute the proxy to others, allowing users with the proxy to subscribe (step 420) to the live appliance automatically by opening the proxy. In one implementation, opening a proxy file in a GUI shell, e.g., by clicking on an icon representing the file, invokes a live player, which will run and subscribe to the corresponding live appliance, if necessary, and begin running it. Subscription is described in more detail in reference to FIG. 6.

The publisher can also choose (step 430) to update (step 440) the live appliance. As previously described, to update the live appliance, the publisher uses the update interface. The update interface allows the publisher to enter the parameters for a new version in the live appliance data source. The update interface generates an updated data source that defines the newest version of a live appliance, specifying the most current version of the virtual machine image.

After an update has occurred, when a subscriber attempts to invoke the live appliance through the live appliance player or by opening the corresponding proxy file, for example, the subscriber automatically receives (step 450) the most current version of the virtual machine image, unless the subscriber update was delayed, for example, due to disconnection or because the background update process had not yet picked up the update.

Figure 5:
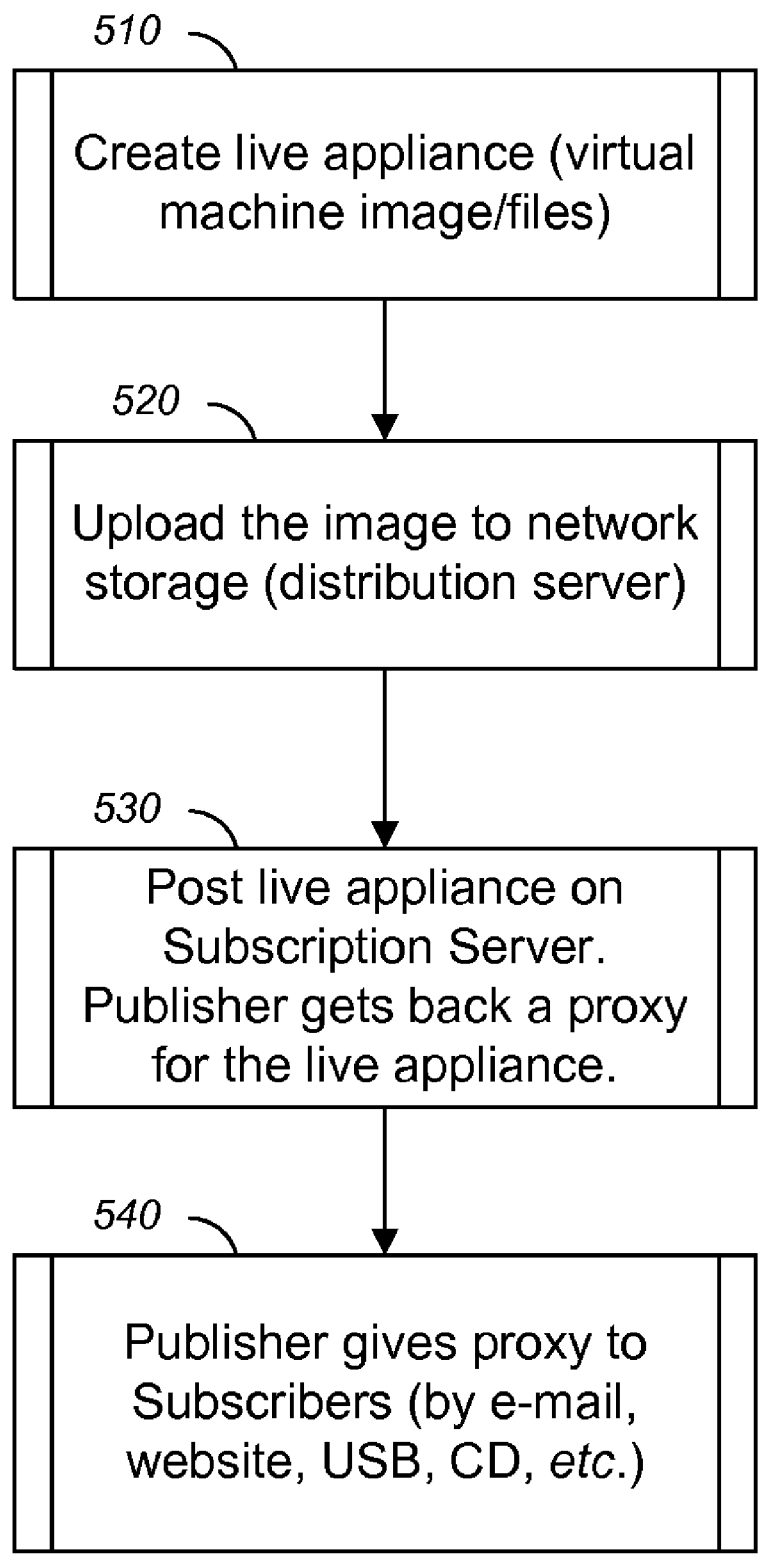
FIG. 5 is a flow chart illustrating a method for publishing a live appliance

FIG. 5 is a flow chart illustrating a method for publishing a live appliance.

The publisher initially creates (step 510) a live appliance. The live appliance can be created from scratch, created from an existing live appliance, by importing a Live CD, or by importing a virtual machine, for example, a VMware virtual machine. Importing a Live CD can be done by create creating a VMware virtual machine with a CD-ROM device pointing to the ISO image of the Live CD. Importing a VMware VM can be as simple as creating a live appliance version configuration for the VM.

A live appliance can be created from scratch by specifying certain properties, e.g., the operating system, certain computing system requirements (e.g., memory usage), and the virtual devices present. The import module of the live appliance player uses these properties to create a virtual machine image and associate the virtual machine image with the live appliance.

A live appliance that is created from an existing live appliance inherits a copy of its basic properties from the original, but the publisher can, for example, add additional applications to the live appliance. If a live appliance is created from an existing live appliance, the live appliance player can share disk storage for blocks that have not changed between the two versions; this sharing can also be used to avoid transferring such blocks multiple times over a network connection. Creating a live appliance is described in more detail in reference to FIG. 7.

Once the live appliance has been created (step 510) by the publisher, the publisher can upload (step 520) the virtual machine image that is used by the live appliance to network storage (e.g., the distribution services). As previously described, the publisher uses the upload interface on the distribution servers to upload the virtual machine image.

The publisher also posts (step 530) the previously created live appliance on the subscription server. As previously described, posting is accomplished through a post interface. After a successful posting operation, the subscription service creates a proxy file stored on the subscription service that can be downloaded by the publisher or linked to by the publisher.

The publisher is then able to send (step 540) the proxy to other subscribers. For example, subscribers can receive a proxy file as an e-mail attachment, as a link on a website, as a file on a USB drive, a CD, or through any other process of transferring files between computer systems.

After the subscriber has received the proxy, the subscriber can invoke the live appliance by activating the proxy, e.g., by opening the proxy file. The subscriber is then taken through a subscription process, e.g., one of the kind described in reference to FIG. 6.

Figure 6:
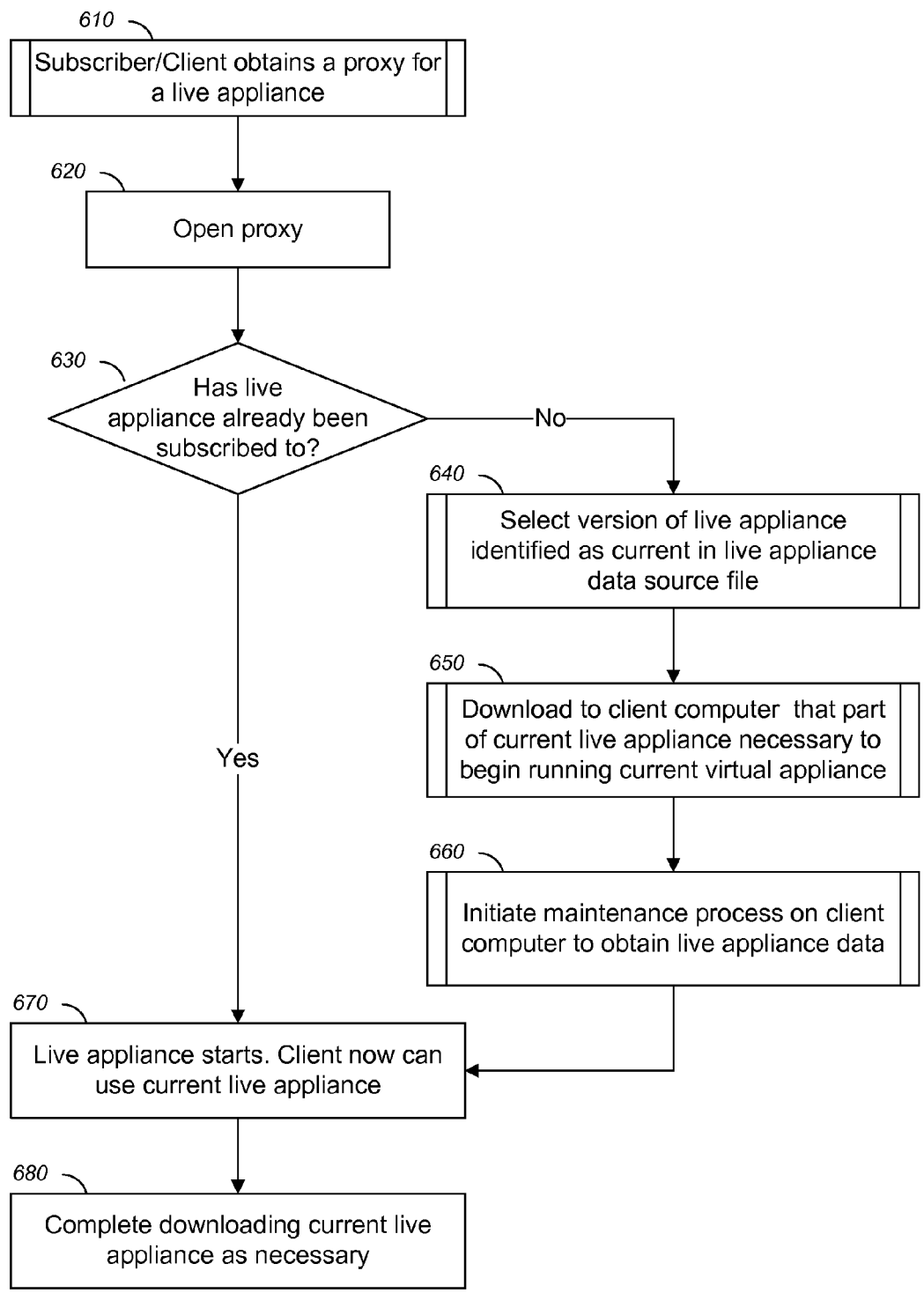
FIG. 6 is a flow chart illustrating a method for subscribing to a live appliance

FIG. 6 is a flow chart illustrating a method for subscribing to a live appliance using a proxy file.

As previously described, the subscriber obtains (step 610) a proxy file for a live appliance from a publisher or by way of a process specified by the publisher (e.g., clicking on a link on a website).

The subscriber can open (step 620) the proxy file at any time. The subscriber does not need to open the proxy file immediately. The proxy file does not need to be opened before the live appliance is updated.

Once the proxy file is opened, the live appliance player determines (step 630) if the live appliance has previously been subscribed to based on the live appliance identifier in the proxy file.

If the live appliance has not been subscribed to, the live appliance player selects (step 640) the version of the live appliance identified as the current live appliance in the live appliance data source file.

The live appliance player then downloads (step 650) the live appliance data source and version configuration to the subscriber's computer. The live appliance player also downloads (step 650) the most current version of the virtual machine image to the subscriber's computer. The live player can download portions of the virtual machine image on demand as they are needed, or while the subscriber's computer is idle.

The live appliance player initiates (step 660) a maintenance process on the subscriber's computer to obtain live appliance data. The process can poll the subscription service to determine if a live appliance has been updated. In some implementations, the subscription service pushes information to subscribed live appliance players, in addition to accepting polling requests. Once a live appliance player has determined, or been informed of, the existence of an update, the player can download the new virtual machine image. Downloading can occur immediately, or at some later point in time.

Once the live appliance has been subscribed to and the necessary portions of the download have completed, the live appliance starts (step 670).

While the live appliance is executing, the live appliance player can complete (step 680) downloading the current virtual machine. As described previously, downloading can occur on demand, or when the subscriber's computer is idle.

Figure 7:
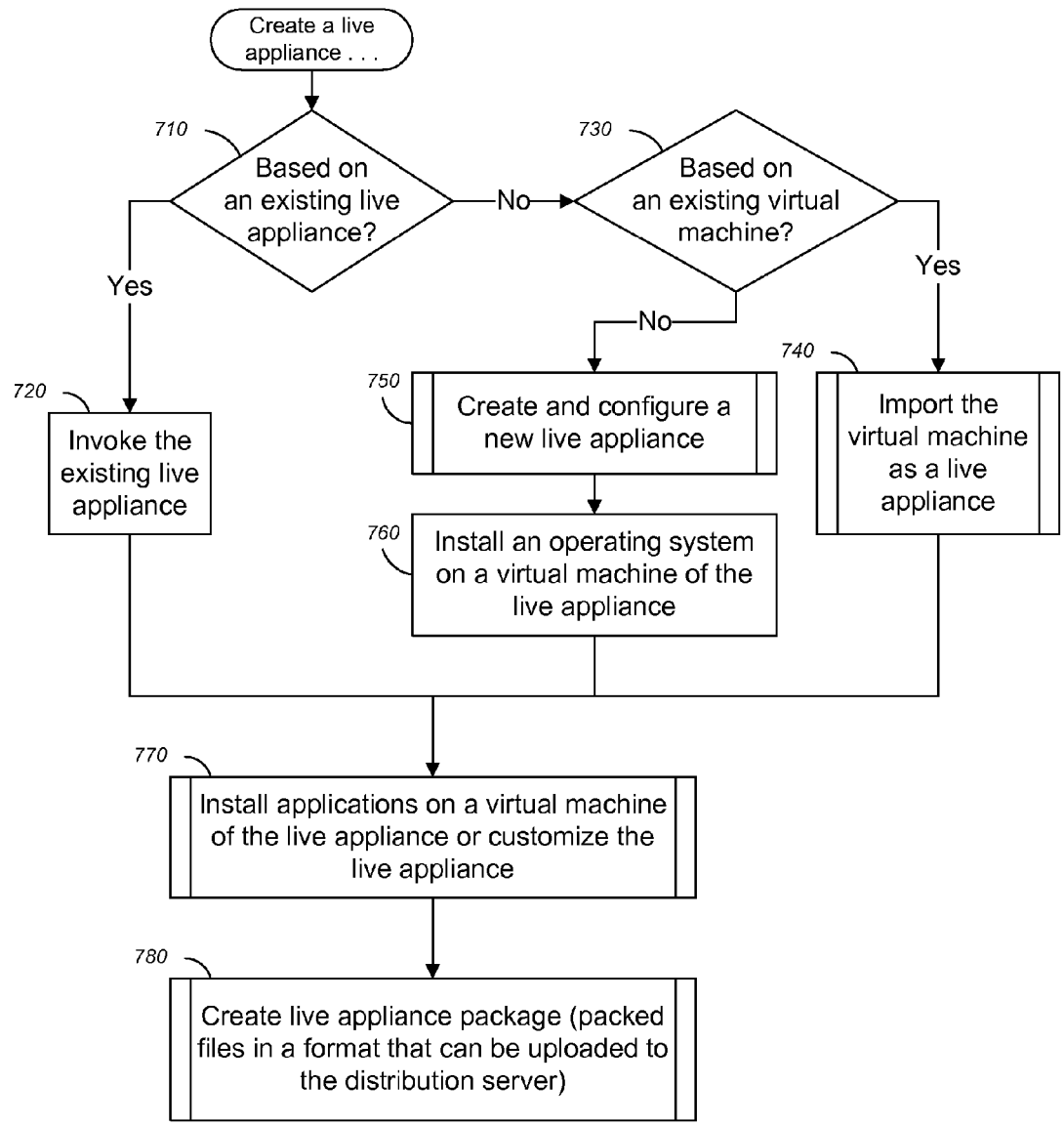
FIG. 7 is a flow chart illustration a method for creating a live appliance Like reference numbers and designations in the various drawings indicate like elements.

FIG. 7 is a flow chart illustration a method for creating a live appliance.

As previously described, a live appliance can be created from scratch, from an existing live appliance, or from an existing virtual machine. The live appliance player determines (step 710) if the live appliance to be created is based on an exiting live appliance. If the desired live appliance is based of an existing live appliance, the live appliance player invokes (step 720) the existing live appliance. Otherwise, the live appliance player determines (step 730) if live appliance to be created is based on an existing virtual machine. If the desired live appliance is based on an existing virtual machine, the live appliance player imports (step 740) the virtual machine as a live appliance.

If the desired live appliance is not based on an existing live appliance or a virtual machine, the live appliance player creates and configures (step 750) a new live appliance. For example, the newly created live appliance can be configured with a virtual machine name, operating system, various drives (e.g., floppy, IDE, or SCSI), and virtual devices. The live appliance player creates the VMware virtual machine, including the disks and configuration file, and the live appliance version configuration. All files are placed in the same subdirectory and relative URLs are used to link between them. The live appliance data source and live appliance proxy are not created at this time.

After a live appliance has been created and configured the publisher installs (step 760) the selected operating system. The operating system is installed from an operating system installer that the publisher has in their possession. Example installers include, install CDs or CD images and installer executables stored locally or remotely. The operating system is installed from the installer onto a virtual machine image of the live appliance.

Once the live appliance player invokes an existing live appliance, the live appliance player has imported an existing virtual machine, or a live appliance has been created, the publisher can install (step 770) applications or customize (step 770) the live appliance. The process of installing applications is similar to installing the operating system; the publisher must have access to the installer for the applications they wish to install. The publisher can customize the live appliance by changing the parameters that were defined during the creation of the original live appliance, e.g., memory usage or virtual devices.

After the publisher has installed their desired applications, they create (step 780) a serialization of the live appliance using the live appliance player. The live appliance player compresses the virtual machine image using traditional compression techniques. Once compressed, the publisher can upload the virtual machine image to a distribution server through the previously described upload interface.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results.

What is claimed is:

1. A computer-implemented method comprising:
   receiving in a computer a request to run a live appliance by receiving in the computer a request to open a proxy for the live appliance, the proxy including a source identifier that is resolved to a location of the data source, the live appliance providing a computing environment that a user runs on the computer, the live appliance being defined by a data source that includes a version description for a current version of a virtual machine image;

determining whether the computer has subscribed to the live appliance, and if not, subscribing to the live appliance on the computer, reading the data source for the live appliance, and using the current version description to initiate downloading of the current version of the virtual machine image to the computer;

when the computer has subscribed to the live appliance, detecting whether a change has occurred in the data source that changes the version description designated as the current version description, and if a change has occurred, reading updated data from the data source, the updated data designating a second version description as the current version description, the second version description describing a different second version of the virtual machine image as the current version of the virtual machine image;

obtaining the current version of the virtual machine image as described by the second version description;

running the current version of the virtual machine image; and running a player to open the proxy, the player being an application program on the computer, the player performing the actions of creating the subscription and obtaining the current version of the virtual machine image as described by the second version description.

2. The method of claim 1, wherein:
the data source includes a respective version description for each of multiple versions of the virtual machine image, the data source further including data designating one of the versions of the virtual machine image as the current version.

3. The method of claim 1, wherein:
the request to open the proxy is a user input received through a graphical user interface.

4. The method of claim 1, further comprising:
running a helper program in response to receiving in the computer the request to run the live appliance, the helper program either starting a player to open the proxy or notifying a running player of the request to open the proxy.

5. The method of claim 1, wherein the player further performs the actions of detecting whether a change has occurred in the data source.

6. The method of claim 1, wherein a background process performs the actions of detecting whether a change has occurred in the data source.

7. The method of claim 1, wherein:
the player performs polling of the data source to detect whether a change has occurred in the data source.

8. The method of claim 1, wherein:
the player receives an indication pushed over the Internet that a change has occurred in the data source.

9. The method of claim 1, wherein:
the player includes a virtual machine monitor to run the current version of the virtual machine image.

10. The method of claim 1, wherein:
the player invokes a virtual machine monitor to run the current version of the virtual machine image.

11. The method of claim 1, wherein:
the player comprises a virtual appliance transceiver.

12. The method of claim 1, wherein:
the player provides a user file system to provide writeable data storage for the running virtual machine image, the user file system storing file data and metadata on a local data store coupled to the computer.

13. The method of claim 12, wherein:
the user file system is a networked file system protocol implemented in the player that maps file system operations to the local data store.

14. The method of claim 13, wherein:
data files stored on the local data store are stored in a FAT (File Allocation Table) or an NTFS (New Technology File System) file system.

15. The method of claim 13, wherein the networked file system protocol is an NFS (Network File System), 5 MB (Server Message Block), CIFS (Common Internet File System) or AFS (Andrew File System) protocol.

16. The method of claim 12, wherein:
the local data store is an internal disk drive in the computer, an external disk drive, an attachable disk drive, or an attachable solid state memory device, or an audio or video media player device.

17. The method of claim 12, wherein the file data and metadata in local store is visible to programs running under a host operating system of the computer.

18. The method of claim 1, wherein:
the player uses persistent storage on the computer for user profile and registry information to allow user configuration of the current virtual machine image to be persistent across updates to the current virtual machine image and across rebooting of the computer.

19. The method of claim 18, wherein:
the persistent storage is provided by an attachable personal storage device.

20. The method of claim 1, further comprising:
obtaining the proxy as an attachment to an e-mail message, as an attachment to an instant message, through a link on a web page, or as a pre-installed file on a read-only or a writable memory device.

21. The method of claim 1, wherein:
the data source is an XML (Extensible Markup Language) file;
the proxy is an XML file that includes a unique identifier identifying the live appliance and a source identifier URL (Uniform Resource Locator) for the data source;
each version description is an XML file that identifies a respective virtual machine configuration by a link to the virtual machine configuration; and
each virtual machine configuration is an XML file that includes respective virtual machine configuration data, disk configuration and location information for one or more virtual disks, the one or more virtual disks including a respective virtual machine image.

22. The method of claim 21, wherein:
the virtual machine configuration data for a version includes a title for the version, a description of the version, and a change history for the version.

23. The method of claim 1, wherein:
obtaining the current version of the virtual machine image includes reading parts of the virtual machine image on demand.

24. The method of claim 1, wherein:
the first version of the virtual machine image is in a first format and the second version of the virtual machine image is in a different second format.

25. The method of claim 24, wherein:
the first format is a VMware format and the second format is a Virtual PC format.

26. The method of claim 1, further comprising:
obtaining the proxy from a subscription service;
obtaining the data source from the subscription service; and obtaining the virtual machine configuration for the current version and the one or more virtual disks from a distribution service.

27. The method of claim 26, wherein:
each virtual disk is organized as a series of one or more copy on write data storage resources.

28. A computer program product, tangibly embodied in a non-transitory computer-readable medium, comprising instructions operable to cause a computer to perform operations comprising:
receiving in a computer a request to run a live appliance by receiving in the computer a request to open a proxy for the live appliance, the proxy including a source identifier that is resolved to a location of the data source, the live appliance providing a computing environment that a user runs on the computer, the live appliance being defined by a data source that includes a version description for a current version of a virtual machine image;
determining whether the computer has subscribed to the live appliance, and if not, subscribing to the live appliance on the computer, reading the data source for the live appliance, and using the current version description to initiate downloading of the current version of the virtual machine image to the computer;
when the computer has subscribed to the live appliance, detecting whether a change has occurred in the data source that changes the version description designated as the current version description, and if a change has occurred, reading updated data from the data source, the updated data designating a second version description as the current version description, the second version description describing a different second version of the virtual machine image as the current version of the virtual machine image;
obtaining the current version of the virtual machine image as described by the second version description;
running the current version of the virtual machine image; and
running a player to open the proxy, the player being an application program on the computer, the player performing the actions of creating the subscription and obtaining the current version of the virtual machine image as described by the second version description.

29. The product of claim 28, wherein:
the data source includes a respective version description for each of multiple versions of the virtual machine image, the data source further including data designating one of the versions of the virtual machine image as the current version.

30. The product of claim 28, wherein:
the request to open the proxy is a user input received through a graphical user interface.

31. The product of claim 28, the instructions being operable to cause a computer to perform further operations comprising:
running a helper program in response to receiving in the computer the request to run the live appliance, the helper program either starting a player to open the proxy or notifying a running player of the request to open the proxy.

32. The product of claim 28, wherein the player further performs the actions of detecting whether a change has occurred in the data source.

33. The product of claim 28, wherein a background process performs the actions of detecting whether a change has occurred in the data source.

34. The product of claim 28, wherein the player performs polling of the data source to detect whether a change has occurred in the data source.

35. The product of claim 28, wherein the player receives an indication pushed over the Internet that a change has occurred in the data source.

36. The product of claim 28, wherein the player includes a virtual machine monitor to run the current version of the virtual machine image.

37. The product of claim 28, wherein the player invokes a virtual machine monitor to run the current version of the virtual machine image.

38. The product of claim 28, wherein the player comprises a virtual appliance transceiver.

39. The product of claim 28, wherein the player provides a user file system to provide writeable data storage for the running virtual machine image, the user file system storing file data and metadata on a local data store coupled to the computer.

40. The product of claim 39, wherein the user file system is a networked file system protocol implemented in the player that maps file system operations to the local data store.

41. The product of claim 40, wherein data files stored on the local data store are stored in a FAT (File Allocation Table) or an NTFS (New Technology File System) file system.

42. The product of claim 40, wherein the networked file system protocol is an NFS (Network File System), 5 MB (Server Message Block), CIFS (Common Internet File System) or AFS (Andrew File System) protocol.

43. The product of claim 39, wherein the local data store is an internal disk drive in the computer, an external disk drive, an attachable disk drive, or an attachable solid state memory device, or an audio or video media player device.

44. The product of claim 39, wherein the file data and metadata in local store is visible to programs running under a host operating system of the computer.

45. The product of claim 28, wherein the player uses persistent storage on the computer for user profile and registry information to allow user configuration of the current virtual machine image to be persistent across updates to the current virtual machine image and across rebooting of the computer.

46. The product of claim 45, wherein the persistent storage is provided by an attachable personal storage device.

47. The product of claim 28, the instructions being operable to cause a computer to perform further operations comprising:
obtaining the proxy as an attachment to an e-mail message, as an attachment to an instant message, through a link on a web page, or as a pre-installed file on a read-only or a writable memory device.

48. The product of claim 28, wherein:
the data source is an XML (Extensible Markup Language) file;
the proxy is an XML file that includes a unique identifier identifying the live appliance and a source identifier URL (Uniform Resource Locator) for the data source;
each version description is an XML file that identifies a respective virtual machine configuration by a link to the virtual machine configuration; and
each virtual machine configuration is an XML file that includes respective virtual machine configuration data, disk configuration and location information for one or more virtual disks, the one or more virtual disks including a respective virtual machine image.

49. The product of claim 48, wherein the virtual machine configuration data for a version includes a title for the version, a description of the version, and a change history for the version.

50. The product of claim 28, wherein obtaining the current version of the virtual machine image includes reading parts of the virtual machine image on demand.

51. The product of claim 28, wherein the first version of the virtual machine image is in a first format and the second version of the virtual machine image is in a different second format.

52. The product of claim 51, wherein the first format is a VMware format and the second format is a Virtual PC format.

53. The product of claim 28, the instructions being operable to cause a computer to perform further operations comprising:

obtaining the proxy from a subscription service;

obtaining the data source from the subscription service; and obtaining the virtual machine configuration for the current version and the one or more virtual disks from a distribution service.

54. The product of claim 53, wherein each virtual disk is organized as a series of one or more copy on write data storage resources.

\* \* \* \* \*